United States Patent
Dehmas et al.

(10) Patent No.: US 9,246,537 B2
(45) Date of Patent: Jan. 26, 2016

(54) METHOD FOR DETERMINING THE ARRIVAL TIME OF A UWB PULSE AND CORRESPONDING RECEIVER

(71) Applicants: Commissariat a l'energie atomique et aux energies alternatives, Paris (FR); BE SPOON, Bourget du Lac (FR)

(72) Inventors: Francois Dehmas, Vif (FR); Gilles Masson, Renage (FR); Laurent Ouvry, Grenoble (FR)

(73) Assignees: Commissariat à l'énergie atomique et aux énergies alternatives, Paris (FR); BE SPOON, Bourget du Lac (FR)

( * ) Notice: Subject to any disclaimer, the term of this patent is extended or adjusted under 35 U.S.C. 154(b) by 0 days.

(21) Appl. No.: 14/435,283

(22) PCT Filed: Oct. 10, 2013

(86) PCT No.: PCT/EP2013/071127
§ 371 (c)(1),
(2) Date: Apr. 13, 2015

(87) PCT Pub. No.: WO2014/060278
PCT Pub. Date: Apr. 24, 2014

(65) Prior Publication Data
US 2015/0295620 A1 Oct. 15, 2015

(30) Foreign Application Priority Data
Oct. 16, 2012 (FR) .................................... 12 59861

(51) Int. Cl.
*H04B 1/69* (2011.01)
*H04B 1/06* (2006.01)

(52) U.S. Cl.
CPC .. *H04B 1/69* (2013.01); *H04B 1/06* (2013.01); *H04B 2001/6908* (2013.01)

(58) Field of Classification Search
CPC .... H04B 1/69; H04B 1/06; H04B 2001/6908; H04B 1/005; H04B 1/0003
See application file for complete search history.

(56) References Cited

U.S. PATENT DOCUMENTS

| 4,583,048 A | * | 4/1986 | Gumacos et al. | ... H04L 27/2273 329/302 |
| 5,550,811 A | * | 8/1996 | Kaku et al. | ......... H04B 1/70753 370/342 |

(Continued)

FOREIGN PATENT DOCUMENTS

EP 1 580 901 9/2005

OTHER PUBLICATIONS

U.S. Appl. No. 14/435,370, filed Apr. 13, 2015, Dehmas, et al.

(Continued)

*Primary Examiner* — Dac Ha
(74) *Attorney, Agent, or Firm* — Oblon, McClelland, Maier & Neustadt, L.L.P.

(57) ABSTRACT

A method for determining arrival time of a UWB pulse at a receiver. When a pulse is modulated at an RF frequency, the receiver includes a quadrature demodulator, a first correlating stage for correlating the in-phase signal with the first and second signals of an orthogonal base on a time window and a second correlating stage for correlating the quadrature signal with the first and second signals of the orthogonal base on the same window, a phase estimator estimating the phase of the signal received in the orthogonal base from the correlation results of the first and/or second correlating stage(s), and a computing device determining the arrival time from the phase thus estimated.

17 Claims, 6 Drawing Sheets

(56) References Cited

U.S. PATENT DOCUMENTS

| | | | | |
|---|---|---|---|---|
| 6,683,493 B1* | 1/2004 | Fujimora et al. | ............ | H04L 7/04 329/304 |
| 2005/0232381 A1 | 10/2005 | Paquelet et al. | | |
| 2014/0204977 A1* | 7/2014 | Morche | ................... | H04B 1/69 375/130 |
| 2014/0243016 A1 | 8/2014 | Denis et al. | | |
| 2014/0256353 A1 | 9/2014 | Denis et al. | | |
| 2014/0287776 A1 | 9/2014 | Denis et al. | | |

OTHER PUBLICATIONS

U.S. Appl. No. 14/435,283, filed Apr. 13, 2015, Dehmas, et al.
U.S. Appl. No. 14/435,338, filed Apr. 13, 2015, Ouvry, et al.
U.S. Appl. No. 14/739,072, filed Jun. 15, 2015, Dehmas, et al.
Bautista, et al., "Low power beamforming RF architecture enabling fine ranging and AOA techniques", IEEE International Conference on Ultra-Wideband, (Sep. 14, 2011), pp. 585-589, XP 032115737.
Heiries, et al., "UWB Backscattering System for Passive RFID Tag Ranging and Tracking", IEEE International Conference on Ultra-Wideband, (Sep. 14, 2011), pp. 489-493, XP 032115715.
Masson, et al., "A 1 nJ/b 3.2-to-4.7 GHz UWB 50 Mpulses/s Double Quadrature Receiver for Communication and Localization", IEEE, (2010), pp. 502-505.
International Search Report Issued Jan. 20, 2014 in PCT/EP13/071127 Filed Oct. 10, 2013.
French Search Report Issued Jun. 12, 2013 in Application No. FR 1259861 Filed Oct. 16, 2012.

* cited by examiner

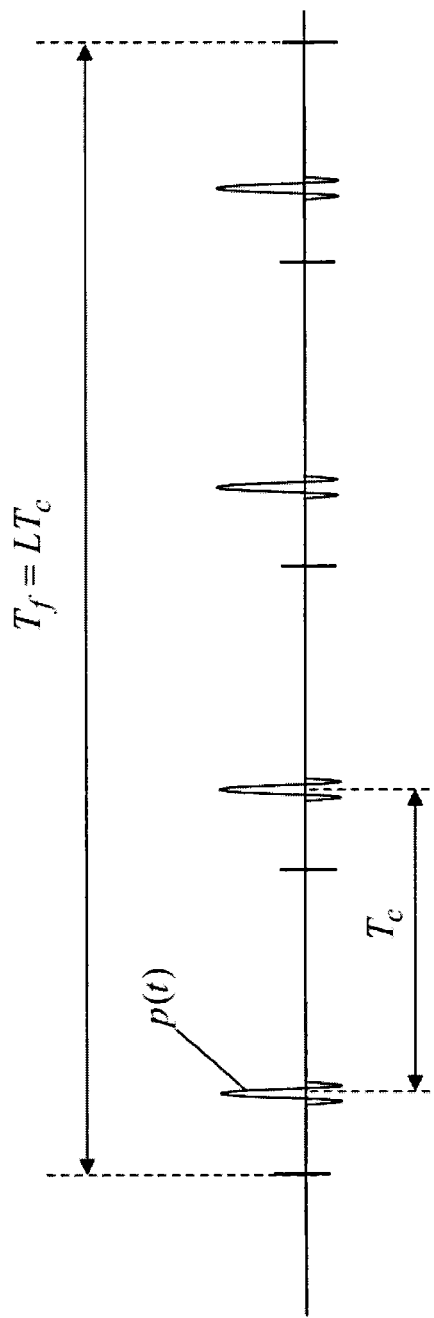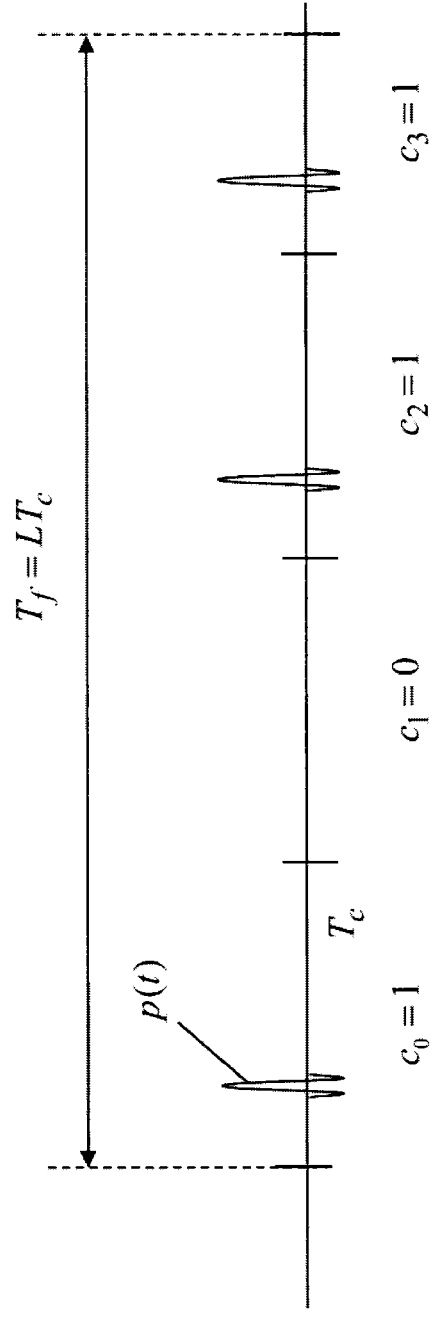

METHOD FOR DETERMINING THE ARRIVAL TIME OF A UWB PULSE AND CORRESPONDING RECEIVER

TECHNICAL FIELD

The present invention relates to the field of UWB (Ultra Wide Band) receivers and more particularly the synchronization of such receivers.

STATE OF PRIOR ART

Pulsed type ultra-wide band (UWB) telecommunication systems are well known in the state of the art. In such a system, a symbol emitted by a transmitter is transmitted using a sequence of ultra-short pulses, in the order of one nanosecond or one hundred picoseconds.

FIG. 1A schematically illustrates the signal emitted by a UWB transmitter, corresponding to a given information symbol. This signal consists of pulses being repeated with a period $T_c$.

The signal emitted by the transmitter, in the absence of a modulation by modulation symbols, can be expressed in the following way:

$$s_{Tx}(t) = \sum_{k=0}^{L-1} p(t-kT_c)\cos(2\pi f_0(t-kT_c) + \varphi_0) \quad (1)$$

where p(t) is the form of the unit pulse into baseband, $f_0$ is the carrier frequency, $\phi_0$, the phase at the origin, and $T_c$ is the repetition period. The duration $\tau$ of the unit pulse p(t) is substantially lower than the duration of the period $T_c$.

This base signal can be amplitude and/or position modulated to transmit one symbol per frame consisting of a given number of repetition periods. The frame is of duration $T_f = LT_c$ where L is the number of periods in the frame. For example, if the modulation is a Pulse Position Modulation (PPM), the modulated signal can be expressed in the form:

$$s_{Tx}(t) = \sum_{k=0}^{L-1} p(t-kT_c-m\varepsilon)\cos(2\pi f_0(t-kT_c-m\varepsilon) + \varphi_0) \quad (2)$$

where $\epsilon$ is a modulation delay substantially lower than the period $T_c$ and m=0, . . . , M−1 is the PPM M-ary position of the symbol.

In a similar way, a symbol can be transmitted by the UWB transmitter by means of an amplitude or phase modulation at which the modulated signal can then be expressed in the form:

$$s_{Tx}(t) = \sum_{k=0}^{L-1} a_m p(t-kT_c)\cos(2\pi f_0(t-kT_c) + \varphi_0) \quad (3)$$

where $\alpha_m$ is the symbol to be transmitted, for example a PAM (Pulse Amplitude Modulation) or (D)BPSK ((Differential) Binary Phase Shift Keying) symbol.

To separate the transmissions of different transmitters, it can be considered that each transmitter is associated with a given time hopping code $c_k$, k=0, . . . , L−1, $c_k \in \{0, \ldots, L-1\}$, with the proviso that the codes relating to different transmitters are orthogonal. FIG. 1B illustrates the non-modulated signal of a transmitter using a time hopping code. When it is modulated by a position modulation or amplitude modulation, the signal transmitted is respectively written as:

$$s_{Tx}(t) = \sum_{k=0}^{L-1} p(t-c_k T_c - m\varepsilon)\cos(2\pi f_0(t-kT_c - m\varepsilon) + \varphi_0) \quad (4)$$

and $$s_{Tx}(t) = a_m \sum_{k=0}^{L-1} p(t-c_k T_c)\cos(2\pi f_0(t-kT_c) + \varphi_0) \quad (5)$$

Regardless of the modulation type used, the receiver must precisely determine the arrival time of the UWB pulses received. Indeed, the receiver does not generally a priori know in which time windows the UWB pulses appear (lack of synchronization reference and, if any, ignorance of the time hopping code used). Additionally, when a PPM (Pulse Position Modulation) is used, the arrival time of the pulse carries the modulation information and must consequently be precisely determined.

A theoretical method for determining the arrival time of a UWB pulse consists in carrying out a correlation of this signal with a succession of local replica of the pulse, offset in time, in other words a sliding correlation. However, such a method is not feasible in practice because the brevity of the pulse would impose to carry out a very high number of correlations, even for a relatively short time window, for example in the order of a few hundred ns.

Patent application EP-A-1580901 provides a method for detecting the arrival time of a pulse in a time window which does not require a sliding correlation to be carried out.

The principle of this method is illustrated in FIG. 2. It uses a UWB receiver 200 comprising a first baseband demodulation stage 210 followed, for each of the I and Q channels, by a correlation stage with two quadrature low frequency sine curves. More precisely, the quadrature mixer 220 carries out a projection of the in-phase signal, noted $s_I$, on a base consisting of two low frequency orthogonal sine curves. In a similar way, the quadrature mixer 220 carries out a projection of the quadrature signal on this same base. The signals obtained by projection, noted $s_{II}, s_{IQ}$ for the channel I and $s_{QI}, s_{QQ}$ for the channel Q are integrated inside a time window (called integration time window hereinafter) in the integrators 230. Optionally, the integration results are accumulated on a plurality of time windows, separated by the repetition period of the UWB signal or offset according to a time hopping code. The integrated signals are quadratically summed in 235, 240 and the sum thus obtained is compared with a threshold value in 250. If the sum obtained exceeds the threshold value, the receiver concludes that a pulse has been received in the time window.

The UWB receiver 200 however does not enable a UWB pulse to be located in the integration time window.

The article of G. Masson et al. entitled "A 1 nJ/b 3.2 to 4.7 GHz UWB 50 Mpulses/s double quadrature receiver for communication and localization" published in Proc. of the ESS-CIRC 2010, 14-16 Sep. 2010, pp. 502-505, describes the architecture of such a receiver and mentions the possibility of using correlation signals with low frequency sine curves to deduce the arrival time (ToA) of the UWB pulse in the integration time window. However, the correlation signals of the channels I and Q, that is $s_{II}, s_{IQ}$ for the channel I and $s_{QI}, s_{QQ}$ for the channel Q do not enable the arrival time to be unambiguously determined.

Therefore, the purpose of the present invention is to provide a method for precisely estimating the arrival time of a UWB pulse in an integration time window which does not require a sliding correlation and which is not affected by any ambiguity.

DISCLOSURE OF THE INVENTION

The present invention is defined by a method for determining the arrival time of a UWB pulse at a receiver, comprising the following steps of:

(a) receiving a UWB signal containing said pulse;
(b) correlating the signal thus received with a first signal and a second signal making up an orthogonal base to obtain respectively a first projection value on said first signal and a second projection value on said second signal, the correlation being carried out on a time window of duration T;

said method further comprising the following steps:
(c) the first and second signals are two quadrature versions of a same periodical signal of period 2T;
(d) the phase of the received signal is estimated in the orthogonal base from the first and second projection values;
(e) the arrival time of said pulse is determined from the phase thus estimated.

Advantageously, the phase of the signal received in the orthogonal base is obtained by $$\hat{\phi} = \arctan\left(\frac{AQ}{AI}\right)$$

where AI is the first projection value and AQ is the second projection value.

According to one embodiment, since the UWB signal is modulated at a carrier frequency, a translation into baseband of the signal received in step (a) is carried out to obtain an in-phase signal and a quadrature signal with a local oscillator at said carrier frequency, and the signal received in step (b) is correlated by carrying out:

(b1) a first correlation of the in-phase signal with the first and second signals of the orthogonal base to obtain respectively first and second projection values, the correlation being carried out on the detection window of duration T;
(b2) a second correlation of the quadrature signal with the first and second signals of the orthogonal base to obtain respectively third and fourth projection values, the correlation being carried out on the window of duration T;
(d1) the phase of the signal received in the orthogonal base being estimated from the first and second projection values and/or third and fourth projection values.

Advantageously, the phase of the signal received in the orthogonal base is estimated by $$\hat{\varphi}_I = \arctan\left(\frac{IQ}{II}\right)$$

where II is the first projection value and IQ is the second projection value.

Alternatively, the phase of the signal received in the orthogonal base can be estimated by $$\hat{\varphi}_Q = \arctan\left(\frac{QQ}{QI}\right)$$

where QI is the third projection value and QQ is the fourth projection value.

Further alternatively, the phase of the signal received in the orthogonal base is estimated by:

$$\hat{\varphi}_I = \arctan\left(\frac{IQ}{II}\right)$$

if the energy of the in-phase signal, in the detection window, is higher than the energy of the quadrature signal, in the same window;

$$\hat{\varphi}_Q = \arctan\left(\frac{QQ}{QI}\right)$$

in the reverse case;
where II, IQ, QI, QQ are respectively the first, second, third and fourth projection values.

According to a first alternative of the orthogonal base, the first and second signals of the orthogonal base are respectively given by $$e_1(t) = \cos\left(2\pi\frac{t}{2T} + \beta\right) \text{ and } e_2(t) = \sin\left(2\pi\frac{t}{2T} + \beta\right)$$

where β is any phase.

According to a second alternative of the orthogonal base, the first and second signals of the orthogonal base are respectively given by $e_1(t)=e(t-t_\beta)$ and $e_2(t)=e(t-T/2-t_\beta)$ where $t_\beta$ is any time and e(t) is the function defined by e(t)=+1 if 0≤t<T and e(t)=−1 if T≤t<2T.

The invention also relates to a receiver for determining the arrival time of a UWB pulse comprising:

a correlation stage for correlating a signal received by the receiver with a first signal ($e_1$) and a second signal ($e_2$) making up an orthogonal base to obtain respectively a first projection value on said first signal and a second projection value on said second signal, the correlation being carried out on a detection window of duration T, the first and second signals are two quadrature versions of a same periodical signal of period 2T;

the receiver further comprises:
a phase estimator for estimating the phase of the signal received in the orthogonal base from the first and second projection values;
computing means for determining the arrival time of said pulse from the phase thus estimated.

The phase estimator advantageously estimates the phase by means of $$\hat{\phi} = \arctan\left(\frac{AQ}{AI}\right)$$

where AI is the first projection value and AQ is the second projection value.

When the UWB pulse is modulated at a carrier frequency, the receiver can further comprise:

a quadrature demodulator including a local oscillator, said demodulator translating into baseband the signal received by the receiver to obtain an in-phase signal and a quadrature signal with said local oscillator;
the correlating stage comprising:
a first stage on the in-phase channel for correlating the in-phase signal with said first and second signals of the orthogonal base to provide respectively said first and second projection values, and a second stage on the quadrature channel for correlating the quadrature signal with said first and second signals of the orthogonal base to provide respectively said third and fourth projection values;

the phase estimator estimating the phase of the signal received in the orthogonal base from the first and second projection values and/or third and fourth projection values.

The estimator can estimate the phase by means of $$\hat{\varphi}_I = \arctan\left(\frac{IQ}{II}\right)$$

where II is the first projection value and IQ is the second projection value.

Alternatively, the estimator can estimate the phase by means of $$\hat{\varphi}_Q = \arctan\left(\frac{QQ}{QI}\right)$$

where QI is the third projection value and QQ is the fourth projection value.

Further alternatively, the estimator can estimate the phase by means of:

$$\hat{\varphi}_I = \arctan\left(\frac{IQ}{II}\right)$$

if the energy of the in-phase signal, in the integration window, is higher than the energy of the quadrature signal, in the same window;

$$\hat{\varphi}_Q = \arctan\left(\frac{QQ}{QI}\right)$$

in the reverse case;
where II, IQ, QI, QQ are respectively the first, second, third and fourth projection values.

According to a first alternative of the orthogonal base, the first and second signals of the orthogonal base are respectively given by $$e_1(t) = \cos\left(2\pi\frac{t}{2T} + \beta\right) \text{ and } e_2(t) = \sin\left(2\pi\frac{t}{2T} + \beta\right)$$

where $\beta$ is any phase.

According to a second alternative of the orthogonal base, the first and second signals of the orthogonal base are respectively given by $e_1(t)=e(t-t_\beta)$ and $e_2(t)=e(t-T/2-t_\beta)$ where $t_\beta$ is any time and e(t) is the function defined by $e(t)=+1$ if $0 \le t < T$ and $e(t)=-1$ if $T \le t < 2T$.

According to a third alternative of the orthogonal base, the first and second signals of the orthogonal base are respectively given by:

$$e_1(t) = \cos\left(2\pi\frac{t}{2T} + \beta\right) \text{ and } e_2(t) = \sin\left(2\pi\frac{t}{2T} + \beta\right)$$

where $\beta$ is any phase, when the pulse width is lower than a predetermined threshold; and by $e_1(t)=e(t-t_\beta)$ and $e_2(t)=e(t-T/2-t_\beta)$ where $t_\beta$ is any time and e(t) is the function defined by $e(t)=+1$ if $0 \le t < T$ and $e(t)=-1$ if $T \le t < 2T$, when the pulse width is higher than said threshold.

BRIEF DESCRIPTION OF THE DRAWINGS

Further characteristics and advantages of the invention will appear upon reading a preferential embodiment of the invention made in reference to the appended figures in which:

FIG. 1A, already described, represents an exemplary pulsed type UWB signal;

FIG. 1B, already described, represents an exemplary pulsed type UWB signal coded by a time hopping code;

DETAILED DISCLOSURE OF PARTICULAR EMBODIMENTS

A receiver intended to receive a pulsed UWB signal will be considered in the following. This pulsed signal can be coded by a time hopping code or not, being non-modulated or modulated by modulation symbols belonging to a position, amplitude or phase modulation alphabet or other.

It will be assumed in the following that the receiver has to determine the arrival time of a pulse inside a given time window. As indicated in the introducing part, this will in particular be the case when the receiver attempts to be synchronized on the UWB signal, when it attempts to correct a clock drift, or looks for a time hopping code used by the transmitter of this signal. This will also be the case in the context of a distance measurement by a UWB transceiver, the distance being obtained from the arrival time of the UWB signal reflected on the target the distance of which is desired to be measured.

Generally, the UWB pulse the arrival time of which is attempted to be determined can be approximated in the following form:

$$p(t) = A_r \cos(2\pi f_0(t-t_0) + \alpha)\exp\left(-\left(\frac{t-t_0}{\tau}\right)^2\right) \quad (6)$$

where $A_r$ is the amplitude of the pulse emitted, $f_0$ is the center frequency of the pulse, that is the carrier frequency, $t_0$ the instant corresponding to the pulse peak, $\alpha$ is the pulse phase at the time $t_0$ and $\tau$ is the pulse width, supposed to be Gaussian. Generally, the pulse width is defined as the reverse of the width of the pass-band at 3 dB.

Figure 2:
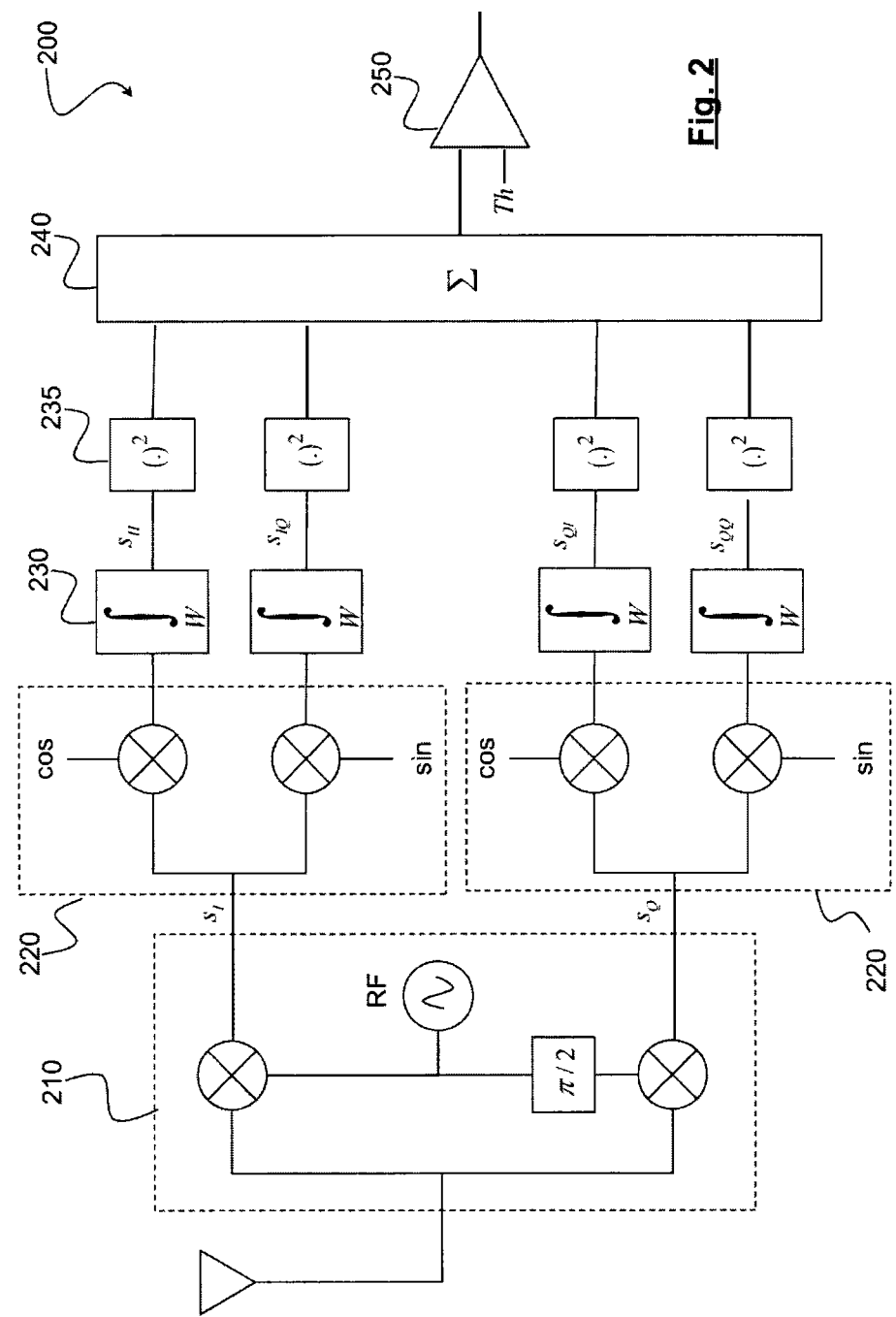
FIG. 2, already described, schematically represents the structure of a UWB receiver enabling the presence of a UWB pulse to be detected in a time window.
Figure 3A:
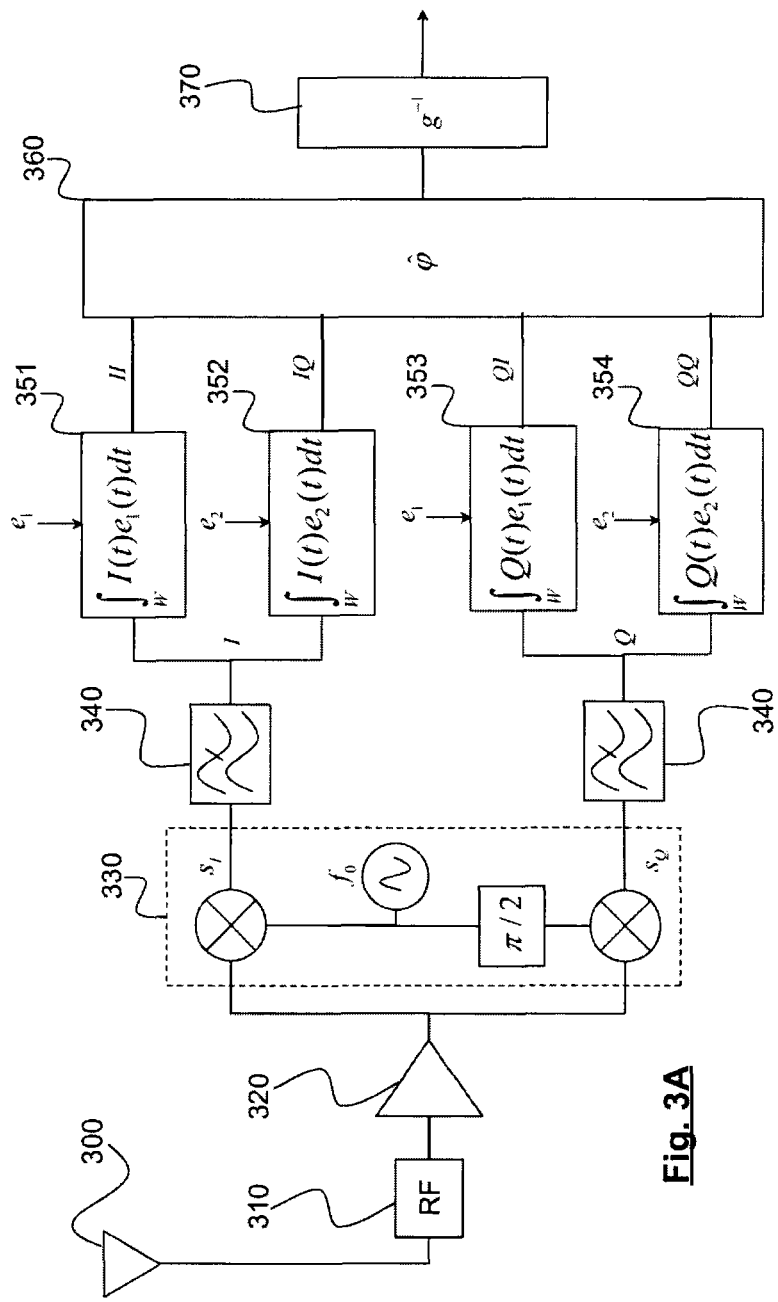
FIG. 3A schematically represents a UWB receiver according to a first embodiment of the invention.

FIG. 3A represents a UWB receiver according to a first embodiment of the invention.

This receiver comprises a UWB antenna 300, an RF filter followed by a low noise amplifier 320.

The signal received by the receiver, thus filtered and amplified, is translated into baseband by the quadrature demodulator 330 using a local oscillator at the carrier frequency $f_0$.

The signals obtained on the channels I and Q of the demodulator 330 are filtered in the low pass filters 340 before being correlated in 351-354 with signals $e_1$ and $e_2$ forming an orthogonal projection base with the meaning given later.

More precisely, if I(t) and Q(t) are the in-phase and quadrature signals, after filtering, the correlators 351 and 352 carry out a correlation of the in-phase signal respectively with a first signal and a second signal making up the orthogonal projection base, namely:

$$II = \int_W I(t)e_1(t)dt \quad (7)$$

$$IQ = \int_W I(t)e_2(t)dt \quad (8)$$

where W is the integration time window.

In a similar way, the correlators 353 and 354 carry out a correlation of the quadrature signal respectively with the first signal and the second signal of the orthogonal projection base, namely:

$$QI = \int_W Q(t)e_1(t)dt \quad (9)$$

$$QQ = \int_W Q(t)e_2(t)dt \quad (10)$$

Signals II,IQ,QI,QQ from the correlators are digitized and processed by a phase estimator 360. The computing means 370 deduce the arrival time of the UWB pulse from the phase estimated in 360.

Signals $e_1$ and $e_2$ are chosen to be orthogonal in that they satisfy:

$$\int_W e_1(t)e_2(t)dt = 0 \quad (11)$$

Signals $e_1$ and $e_2$ are obtained from a periodic function e having as a period twice the width of the integration time window, both signals being in quadrature signals, that is offset by a quarter of said period. The width of the integration time window will be noted T in the following.

According to a first alternative, said periodic function is a sinusoidal function, for example $$e(t) = \cos\left(2\pi\frac{t}{2T}\right),$$

the quadrature signals $e_1$ and $e_2$ being obtained as follows:

$$e_1(t) = \cos\left(2\pi\frac{t}{2T} + \beta\right) \quad (12\text{-}1)$$

$$e_2(t) = \sin\left(2\pi\frac{t}{2T} + \beta\right) \quad (12\text{-}2)$$

where β is any phase. Since the integration time window W (of width T) only contains a half-period of the signals $e_1$ and $e_2$, the orthogonal base is referred to as a half-period sinusoidal one.

According to a second alternative, said periodical function is a square clock of period 2T, for example such that:

$$e(t)=+1 \text{ if } 0 \le t<T \text{ and } e(t)=-1 \text{ if } T \le t<2T \quad (13)$$

the quadrature signals $e_1$ and $e_2$ being obtained as follows:

$$e_1(t)=e(t-t_\beta) \quad (14\text{-}1)$$

$$e_2(t)=e(t-T/2-t_\beta) \quad (14\text{-}2)$$

where $t_\beta$ is any time. Since the integration time window W (of width T) only contains a half-period of the signals $e_1$ and $e_2$, the orthogonal base is referred to as a half-slot one.

It will be readily verified that signals $e_1$ and $e_2$ according to the first or second alternative are actually orthogonal with respect to the relationship (11).

Without loss of generality, the phase estimator and the computing means will be explained hereinafter for both alternatives contemplated above.

The in-phase signal I(t), at the input of the correlators 351-352, and the quadrature signal Q(t), at the input of the correlators 353-354 can be expressed in the following form:

$$I(t) = A_r\cos(2\pi f_0 t_0 + \theta)\exp\left(-\left(\frac{t-t_0}{\tau}\right)^2\right) \quad (15\text{-}1)$$

$$Q(t) = -A_r\sin(2\pi f_0 t_0 + \theta)\exp\left(-\left(\frac{t-t_0}{\tau}\right)^2\right) \quad (15\text{-}2)$$

where $A_r$ is the amplitude of the signal received, depending on $A_t$ and on the attenuation of the propagation channel, and θ is the phase of the signal received, depending on the phase of the signal emitted, α, on the characteristics of the propagation channel, and on the local oscillator phase used for translating into baseband.

For the sake of simplifying the computations, it will be assumed that the propagation time between the transmitter and the receiver is null and that the integration time window is [0,T], with the proviso that the following conclusions hold true for any propagation time.

According to a first alternative embodiment, the half-period sinusoidal base defined by the expressions (12-1) and (12-2) is used as the orthogonal base.

The projection on this orthogonal base is carried out by the correlators 351-354. At the output of these correlators, there is respectively obtained:

$$II = \int_0^T A_r\cos\left(2\pi\frac{t}{2T} + \beta\right)\cos(2\pi f_0 t_0 + \theta)\exp\left(-\left(\frac{t-t_0}{\tau}\right)^2\right)dt \quad (16\text{-}1)$$

$$IQ = \int_0^T A_r\sin\left(2\pi\frac{t}{2T} + \beta\right)\cos(2\pi f_0 t_0 + \theta)\exp\left(-\left(\frac{t-t_0}{\tau}\right)^2\right)dt \quad (16\text{-}2)$$

$$QI = -\int_0^T A_r\cos\left(2\pi\frac{t}{2T} + \beta\right)\sin(2\pi f_0 t_0 + \theta)\exp\left(-\left(\frac{t-t_0}{\tau}\right)^2\right)dt \quad (16\text{-}3)$$

$$QQ = -\int_0^T A_r\sin\left(2\pi\frac{t}{2T} + \beta\right)\sin(2\pi f_0 t_0 + \theta)\exp\left(-\left(\frac{t-t_0}{\tau}\right)^2\right)dt \quad (16\text{-}4)$$

The expressions (16-1) to (16-4) can be gathered using a complex form:

$$ZI = II + iIQ \quad (17\text{-}1)$$
$$= A_r\cos(2\pi f_0 t_0 + \theta)\int_0^T \exp\left(i\left(2\pi\frac{t}{2T} + \beta\right) - \left(\frac{t-t_0}{\tau}\right)^2\right)dt$$

$$ZQ = QI + iQQ \quad (17\text{-}2)$$
$$= -A_r\sin(2\pi f_0 t_0 + \theta)\int_0^T \exp\left(i\left(2\pi\frac{t}{2T} + \beta\right) - \left(\frac{t-t_0}{\tau}\right)^2\right)dt$$

or, more simply:

$$ZI = A_r \cos(2\pi f_0 t_0 + \theta) z \quad (18\text{-}1)$$

$$ZQ = -A_r \sin(2\pi f_0 t_0 + \theta) z \quad (18\text{-}2)$$

with:

$$z = \frac{\sqrt{\pi}}{2} \tau \cdot \exp\left(-\left(\frac{\pi\tau}{T}\right)^2 + i\left(\frac{2\pi t_0}{T} + \beta\right)\right)\left[\operatorname{erf}\left(\frac{t-t_0}{\tau} - i\frac{\pi\tau}{2T}\right)\right]_{t=0}^{t=T} \quad (19)$$

where erf(.) is the complex error function.

The phase estimator 360 estimates the phase $\phi = \arg(ZI) = \arg(ZQ) = \arg(z)$ (modulo $\pi$) of the baseband signal in the orthogonal base $(e_1, e_2)$ by means of:

$$\hat{\varphi}_I = \arctan\left(\frac{IQ}{II}\right) \quad (20\text{-}1)$$

or alternatively, by means of:

$$\hat{\varphi}_Q = \arctan\left(\frac{QQ}{QI}\right) \quad (20\text{-}2)$$

It will be noted that both estimators $\hat{\phi}_I$ and $\hat{\phi}_Q$ both give an estimation of the phase $\phi$. However, depending on the value of the phase $2\pi f_0 t_0 + \theta$, the energy of the UWB pulse can be carried rather by the signal ZI or by the signal ZQ, as shown by the expressions (18-1) and (18-2).

Either of the estimators can be advantageously selected depending on the energy $|ZI|^2 = A_r^2|z|^2\cos^2(2\pi f_0 t_0 + \theta)$ and $|ZQ|^2 = A_r^2|z|^2\sin^2(2\pi f_0 t_0 + \theta)$. In other words, if the energy $P_I$ of the signal on the in-phase channel, in the integration time window, is higher than the energy $P_Q$ of the signal on the quadrature channel, in the same window, the estimator $\hat{\phi}_I$ will be selected. The estimator $\hat{\phi}_Q$ will be selected in the reverse case. There will thus always be the benefit of the best signal to noise ratio for the phase estimation. In other words, in this case this will be taken as the estimator:

$$\hat{\phi} = \hat{\phi}_I \text{ if } P_I > P_Q$$

$$\hat{\phi} = \hat{\phi}_Q \text{ if } P_I \leq P_Q \quad (21)$$

The estimators $\hat{\phi}_I$ and $\hat{\phi}_Q$, and hence the estimator $\hat{\phi}$, are injective functions of the time window (here $[0,T]$) in the phase space ($[-\pi/2, \pi/2]$), in other words the estimators in question enable the arrival time to be unambiguously obtained, unlike prior art. These injective functions will be respectively noted $g_I(t), g_Q(t), g(t)$. At an estimated phase ($\hat{\phi}_I, \hat{\phi}_Q, \hat{\phi}$), the arrival time of the UWB pulse can be unequivocally deduced by means of the reverse function $(g_I^{-1}, g_Q^{-1}, g^{-1})$.

Returning to FIG. 3A, the phase estimator 360 determines from values II,IQ and/or values QI,QQ coming from the correlators 351-354 the phase of the baseband signal thanks to one of the estimators $\hat{\phi}_I, \hat{\phi}_Q, \hat{\phi}$.

The computing means 370 deduce therefrom, thanks to the abovementioned reverse function $(g_I^{-1}, g_Q^{-1}, g^{-1})$, the arrival time of the UWB pulse. The computing means can comprise a look-up table of the reverse function or an approximation by intervals of said function/reverse function. Alternatives to the computing means can be contemplated by those skilled in the art without departing from the scope of the present invention.

Figure 4A:
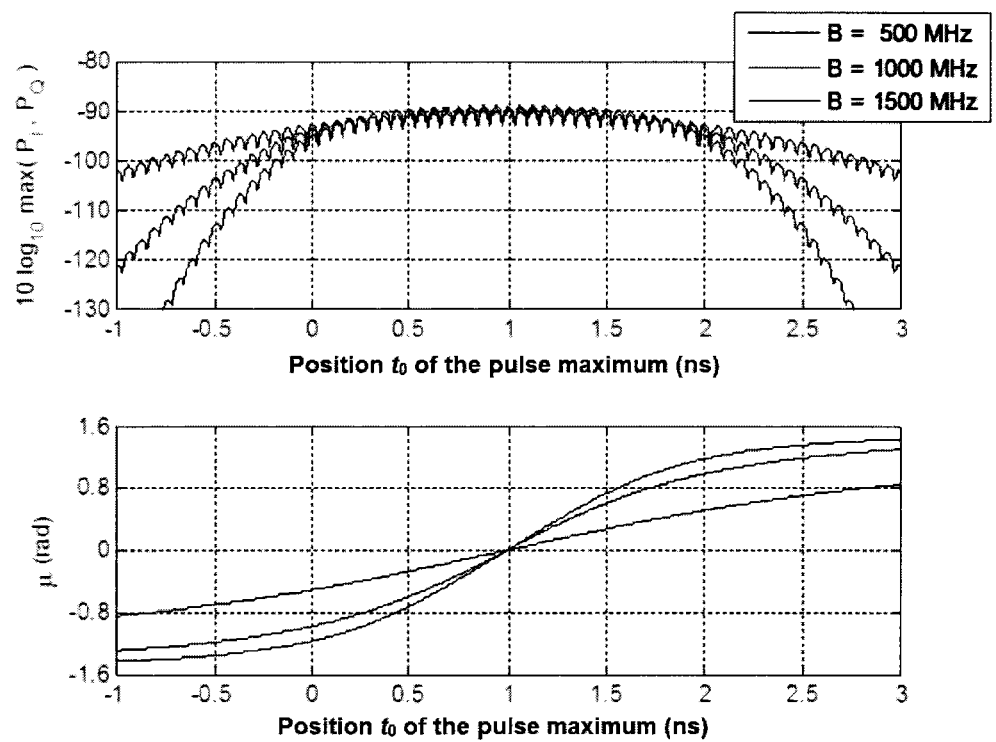
FIG. 4A represents a first function for estimating the arrival time for the receiver of FIG. 3A.

FIG. 4A represents the evaluation of the phase estimator $\hat{\phi}$ as a function of the arrival time of the pulse (here the time $t_0$ corresponding to the maximum of the UWB pulse), for different band widths (and thus different pulse widths $\tau$).

The numerical values used in the expressions (18-1), (18-2) and (19) for the example of FIG. 4A are: $f_0 = 4$ GHz, $T = 2$ ns; $t_0 = 1$ ns; $A_r = 1$; $\theta = 0$; $\text{att}_{dB} = -10$ dB; $\beta = -\pi/2$. It will be noted that a different value of $\beta$ simply results in an offset of the estimation function $\hat{\phi}$ in time.

It will be noticed that FIG. 4A actually represents the estimation function $\hat{\phi}$ beyond the integration time window $[0,T]$, more precisely with a $T/2$ margin on either side of this window. It is thus observed that when the center of the pulse "comes out" of the window but the pulse has a high overlapping degree with the same, the phase estimator $\hat{\phi}(t)$ also enables the arrival time (thus located outside the window) to be detected satisfactorily. However, when the overlapping decreases, the estimation is degraded because of the low signal to noise ratio (low values of the energies $|ZI|^2$ and $|ZQ|^2$).

According to a second alternative embodiment, the half-slot base defined by the expressions (14-1) and (14-2) is used as the orthogonal base.

The projection on this orthogonal base is carried out by the correlators 351-354. At the output of these correlators, and in the same hypotheses as for the first alternative, the signals are respectively obtained:

$$II = A_r \cos(2\pi f_0 t_0 + \theta) x' \quad (22\text{-}1)$$

$$IQ = A_r \cos(2\pi f_0 t_0 + \theta) y' \quad (22\text{-}2)$$

$$QI = A_r \sin(2\pi f_0 t_0 + \theta) x' \quad (22\text{-}3)$$

$$QQ = A_r \sin(2\pi f_0 t_0 + \theta) y' \quad (22\text{-}4)$$

with:

$$x' = \frac{\sqrt{\pi}}{2} \tau \cdot \left[\operatorname{erf}\left(\frac{T-t_0}{\tau}\right) - \operatorname{erf}\left(\frac{-t_0}{\tau}\right)\right] \quad (23\text{-}1)$$

and $$y' = -\frac{\sqrt{\pi}}{2} \tau \cdot \left[2\operatorname{erf}\left(\frac{T/2-t_0}{\tau}\right) - \operatorname{erf}\left(\frac{T-t_0}{\tau}\right) - \operatorname{erf}\left(\frac{-t_0}{\tau}\right)\right] \quad (23\text{-}2)$$

The expressions (22-1) to (22-4) can be gathered using a complex form, and noting $z' = x' + iy'$:

$$ZI = II + iIQ = A_r \cos(2\pi f_0 t_0 + \theta) z' \quad (24\text{-}1)$$

$$ZQ = QI + iQQ = A_r \sin(2\pi f_0 t_0 + \theta) z' \quad (24\text{-}2)$$

As for the first alternative, the phase estimator 360 estimates the phase $\phi' = \arg(ZI) = \arg(ZQ) = \arg(z')$ (modulo $\pi$) of the baseband signal in the orthogonal base $(e_1, e_2)$ by means of the expression (20-1), (20-2) or (21), the estimators being respectively noted $\hat{\phi}'_I, \hat{\phi}'_Q, \hat{\phi}'$.

The estimators $\hat{\phi}'_I$ and $\hat{\phi}'_Q$, and hence the estimator $\hat{\phi}'$, are also injective functions of the time window (here $[0,T]$) in the phase space ($[-\pi/2, \pi/2]$). They thus can be reversed on the image of $[0,T]$, the reverse functions of $\hat{\phi}'_I, \hat{\phi}'_Q, \hat{\phi}'$ being respectively noted ${g'_I}^{-1}, {g'_Q}^{-1}, {g'}^{-1}$.

The phase estimator 360 determines from the values II,IQ and/or values QI,QQ coming from the correlators 351-354 the phase of the baseband signal thanks to one of the estimators $\hat{\phi}'_I, \hat{\phi}'_Q, \hat{\phi}'$.

The computing means 370 deduce therefrom, thanks to the abovementioned reverse function $(g'^{-1}_I, g'^{-1}_Q, g^{-1})$, the arrival time of the UWB pulse.

Figure 4B:
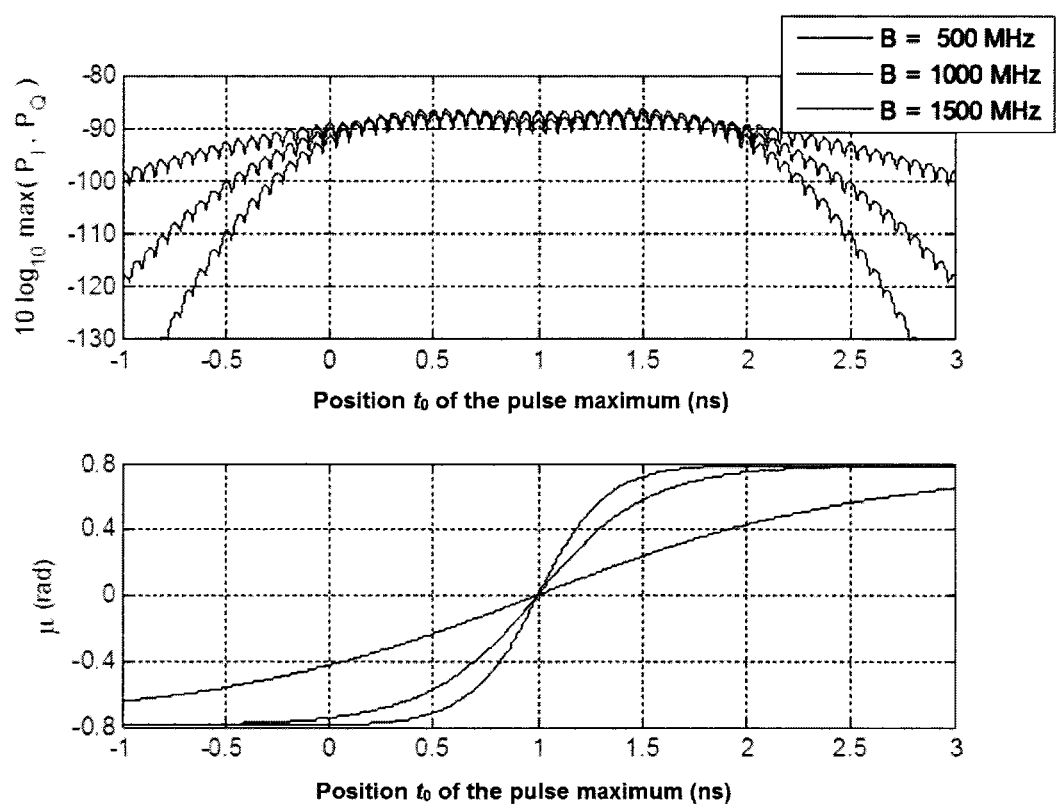
FIG. 4B represents a second function for estimating the arrival time for the receiver of FIG. 3A.

FIG. 4B represents the time course of the phase estimator $\hat{\phi}'$ as a function of the arrival time of the pulse under the same conditions as previously. The numerical values are the same as those of the example in FIG. 4A, with in addition $t_\beta=0$.

As for FIG. 4A, it is noticed that the arrival time (here $t_0$) of the UWB pulse can be determined, including when the peak comes out of the integration time window. This latter conclusion is however only valid under the proviso that the passband of the signal is relatively low (relatively wide pulse consequently overlapping the integration time window).

It will be noted that the curve of the estimator $\hat{\phi}'$ has a linearity zone more reduced than that of the estimator $\hat{\phi}$ in the center zone of the window. As a result, for excursions of the arrival time which are higher than a threshold value, the estimation using the half-slot base will be of a lesser accuracy than that using the half-period sinusoidal base. On the other hand, for low excursions, the accuracy will be better since the slope in the linearity zone is steeper.

It is clear for those skilled in the art that other orthogonal bases can be contemplated given that the signals making up this base are obtained from a periodical function e having as a period twice the width of the integration time window, said signals being selected in quadrature.

In particular, "intermediate" bases between the half-period sinusoidal base and the half-slot base can be obtained by filtering more or fewer harmonics of the half-slot base using a low pass filtering.

Advantageously, a set of orthogonal bases will be available and they will be adaptively used depending on the band width of the UWB signal (width of the UWB pulse). Thus, when the band width is low (wide pulse), the half-slot base will be preferably used and when the band width is high (narrow pulse), the half-period sinusoidal base will be used, so as to keep a same sensitivity whatever the band width.

In the embodiment described above, only a single UWB pulse appearing in a time window has been considered. However, when the UWB signal is periodical or when the successive pulses obey a time code, a plurality of time windows separated by the signal of the UWB signal or offset by the time code can be contemplated. The correlation results obtained on the different windows are then advantageously accumulated at the output of each correlator before being provided to the phase estimator 360.

According to a second embodiment, more particularly relating to a wired transmission, the UWB pulse the arrival time of which is attempted to be determined, is not modulated by a RF carrier but transmitted into baseband, in other words:

$$p(t) = A_t \exp\left(-\left(\frac{t-t_0}{\tau}\right)^2\right) \quad (25)$$

with the same notation conventions as previously. In this case, the UWB receiver does not carry out a translation into baseband by means of a quadrature demodulator at the carrier frequency but directly projects the signal received on the orthogonal base.

Figure 3B:
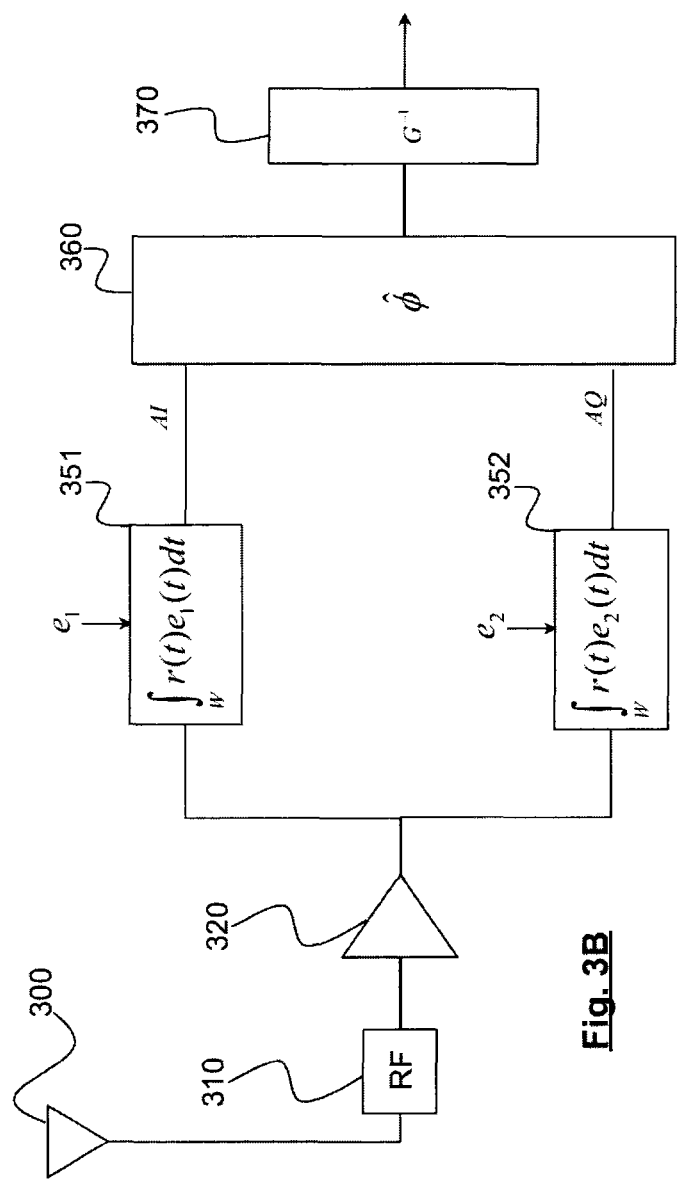
FIG. 3B schematically represents a UWB receiver according to a second embodiment of the invention.

FIG. 3B represents a UWB receiver according to a second embodiment of the invention. Elements bearing the same reference numerals as those of FIG. 3A are identical or similar to those already described.

More precisely, the receiver comprises an antenna 330, a band-pass filter 310, a low noise amplifier 330. The filtered and amplified signal, r(t) is correlated in 351 and 352 with the signals $e_1$ and $e_2$ as defined above.

Keeping the previous notations, at the output of the correlators 351, 352, the signals are respectively obtained:

$$AI = \int_W r(t)e_1(t)dt \quad (26\text{-}1)$$

$$AQ = \int_W r(t)e_2(t)dt \quad (26\text{-}2)$$

The signals AI, AQ are digitized and processed by a phase estimator, 360. This estimator estimates the phase of the signal received r(t) in the orthogonal base $(e_1, e_2)$. The computing means 370 determine the arrival time of the UWB pulse from the phase thus estimated.

The orthogonal base will be successively contemplated according to the first and second alternatives, as for the first embodiment.

If the orthogonal base is half-period sinusoidal, signals AI, AQ are expressed in the form:

$$AI = \int_0^T A_r \cos\left(2\pi\frac{t}{2T} + \beta\right)\exp\left(-\left(\frac{t-t_0}{\tau}\right)^2\right)dt \quad (27\text{-}1)$$

$$AQ = \int_0^T A_r \sin\left(2\pi\frac{t}{2T} + \beta\right)\exp\left(-\left(\frac{t-t_0}{\tau}\right)^2\right)dt \quad (27\text{-}2)$$

Or even, by assuming a complex notation:

$$Z = AI + iAQ = A_r z \quad (28)$$

where z is defined in (19).

The phase estimator 360 estimates the phase $\phi = \arg(Z) = \arg(z)$ of the baseband signal in the orthogonal base $(e_1, e_2)$ by means of:

$$\hat{\phi} = \arctan\left(\frac{AQ}{AI}\right) \quad (29)$$

The function $\hat{\phi}$ is injective of the time window in the phase space. Therefore, it can be reversed on the image of this window in the phase space. The computing means 370 use this reverse function, $G^{-1}$, to determine unambiguously the arrival time of the UWB pulse.

If the orthogonal base is a half-slot base, the signals at the output of the correlators 351 and 352 are respectively expressed as:

$$AI = A_r x' \quad (30\text{-}1)$$

$$AQ = A_r y' \quad (30\text{-}2)$$

and in complex notation:

$$Z = AI + iAQ = A_r z' \quad (31)$$

where x' and y' have been defined in (23-1) and (23-2).

As for the first alternative, the phase estimator 360 estimates the phase $\phi' = \arg(Z) = \arg(z')$ of the baseband signal in the orthogonal base $(e_1, e_2)$ by means of $$\hat{\phi}' = \arctan\left(\frac{AQ}{AI}\right).$$

Since the function $\hat{\phi}'$ is once again injective of the time window in the phase space, it can be reversed on the image of the window. The computing means 370 use this reverse function, $G'^{-1}$, to determine unambiguously the arrival time of the UWB pulse.

The alternatives relating to the accumulation on several successive windows are applicable as for the first embodiment without needing to further detail them herein.

The invention claimed is:

1. A method for determining the arrival time of a UWB pulse at a receiver, comprising:
    (a) receiving a UWB signal containing the pulse;
    (b) correlating the signal thus received with a first signal and a second signal making up an orthogonal base to obtain respectively a first projection value on the first signal and a second projection value on the second signal, the correlation being carried out on a time window of duration T;
    wherein:
    (c) the first and second signals are two quadrature versions of a same periodical signal of period 2T;
    (d) the phase of the received signal is estimated in the orthogonal base from the first and second projection values;
    (e) an arrival time of the pulse is determined from the phase thus estimated.

2. The method for determining the arrival time of a UWB pulse according to claim 1, wherein the phase of the signal received in the orthogonal base is obtained by $$\hat{\phi} = \arctan\left(\frac{AQ}{AI}\right)$$

where AI is the first projection value and AQ is the second projection value.

3. The method for determining the arrival time of a UWB pulse according to claim 1, wherein the UWB signal is modulated at a carrier frequency, and a translation into baseband of the signal received in (a) is carried out to obtain an in-phase signal and a quadrature signal with a local oscillator at the carrier frequency, and the signal received in (b) is correlated by carrying out:
    (b1) a first correlation of the in-phase signal with the first and second signals of the orthogonal base to obtain respectively first and second projection values, the correlation being carried out on the detection window of duration T;
    (b2) a second correlation of the quadrature signal with the first and second signals of the orthogonal base to obtain respectively third and fourth projection values, the correlation being carried out on the window of duration T;
    (d1) the phase of the signal received in the orthogonal base being estimated from the first and second projection values and/or third and fourth projection values.

4. The method for determining the arrival time of a UWB pulse according to claim 3, wherein the phase of the signal received in the orthogonal base is estimated by $$\hat{\phi}_I = \arctan\left(\frac{IQ}{II}\right)$$

where II is the first projection value and IQ is the second projection value.

5. The method for determining the arrival time of a UWB pulse according to claim 3, wherein the phase of the signal received in the orthogonal base is estimated by $$\hat{\phi}_Q = \arctan\left(\frac{QQ}{QI}\right)$$

where QI is the third projection value and QQ is the fourth projection value.

6. The method for determining the arrival time of a UWB pulse according to claim 3, wherein the phase of the signal received in the orthogonal base is estimated by:

$$\hat{\phi}_I = \arctan\left(\frac{IQ}{II}\right)$$

if the energy of the in-phase signal, in the detection window, is higher than the energy of the quadrature signal, in the same window;

$$\hat{\phi}_Q = \arctan\left(\frac{QQ}{QI}\right)$$

in the reverse case;
where II, IQ, QI, QQ are respectively the first, second, third and fourth projection values.

7. The method for determining the arrival time of a UWB pulse according to claim 1, wherein the first and second signals of the orthogonal base are respectively given by $$e_1(t) = \cos\left(2\pi\frac{t}{2T} + \beta\right) \text{ and } e_2(t) = \sin\left(2\pi\frac{t}{2T} + \beta\right)$$

where $\beta$ is any phase.

8. The method for determining the arrival time of a UWB pulse according to claim 1, wherein the first and second signals of the orthogonal base are respectively given by $e_1(t) = e(t-t_\beta)$ and $e_2(t) = e(t-T/2-t_\beta)$ where $t_\beta$ is any time and $e(t)$ is the function defined by $e(t)=+1$ if $0 \le t < T$ and $e(t)=-1$ if $T \le t < 2T$.

9. A receiver for determining the arrival time of a UWB pulse comprising:
    a correlating stage for correlating a signal received by the receiver with a first signal and a second signal making up an orthogonal base to obtain respectively a first projection value on the first signal and a second projection value on the second signal, the correlation being carried out on a detection window of duration T;
    wherein:
    the first and second signals are two quadrature versions of a same periodical signal of period 2T;
    the receiver further comprising:
    a phase estimator estimating the phase of the signal received in the orthogonal base from the first and second projection values;
    computing means for determining an arrival time of the pulse from the phase thus estimated.

10. The receiver according to claim 9, wherein the phase estimator estimates the phase by $$\hat{\phi} = \arctan\left(\frac{AQ}{AI}\right)$$

where AI is the first projection value and AQ is the second projection value.

11. The receiver according to claim 9, wherein the UWB pulse is modulated at a carrier frequency, and the receiver further comprises:

a quadrature demodulator including a local oscillator, the demodulator translating into baseband the signal received by the receiver to obtain an in-phase signal and a quadrature signal with the local oscillator;

the correlating stage comprising:

a first stage on the in-phase channel for correlating the in-phase signal with the first and second signals of the orthogonal base to provide respectively the first and second projection values, and a second stage on the quadrature channel for correlating the quadrature signal with the first and second signals of the orthogonal base to provide respectively the third and fourth projection values;

the phase estimator estimating the phase of the signal received in the orthogonal base from the first and second projection values and/or third and fourth projection values.

12. The receiver according to claim 11, wherein the estimator estimates the phase by $$\hat{\phi}_I = \arctan\left(\frac{IQ}{II}\right)$$

where II is the first projection value and IQ is the second projection value.

13. The receiver according to claim 11, wherein the estimator estimates the phase by $$\hat{\phi}_Q = \arctan\left(\frac{QQ}{QI}\right)$$

where QI is the third projection value and QQ is the fourth projection value.

14. The receiver according to claim 11, wherein the estimator estimates the phase by:

$$\hat{\phi}_I = \arctan\left(\frac{IQ}{II}\right)$$

if the energy of the in-phase signal, in the integration window, is higher than the energy of the quadrature signal, in the same window;

$$\hat{\phi}_Q = \arctan\left(\frac{QQ}{QI}\right)$$

in the reverse case;

where II, IQ, QI, QQ are respectively the first, second, third and fourth projection values.

15. The receiver according to claim 9, wherein the first and second signals of the orthogonal base are respectively given by $$e_1(t) = \cos\left(2\pi \frac{t}{2T} + \beta\right) \text{ and } e_2(t) = \sin\left(2\pi \frac{t}{2T} + \beta\right)$$

where $\beta$ is any phase.

16. The receiver according to claim 9, wherein the first and second signals of the orthogonal base are respectively given by $e_1(t)=e(t-t_\beta)$ and $e_2(t)=e(t-T/2-t_\beta)$ where $t_\beta$ is any time and e(t) is the function defined by $e(t)=+1$ if $0 \leq t < T$ and $e(t)=-1$ if $T \leq t < 2T$.

17. The receiver according to claim 9, wherein the first and second signals of the orthogonal base are respectively given by:

$$e_1(t) = \cos\left(2\pi \frac{t}{2T} + \beta\right) \text{ and } e_2(t) = \sin\left(2\pi \frac{t}{2T} + \beta\right)$$

where $\beta$ is any phase, when the pulse width is lower than a predetermined threshold; and by $e_1(t)=e(t-t_\beta)$ and $e_2(t)=e(t-T/2-t_\beta)$ where $t_\beta$ is any time and e(t) is the function defined by $e(t)=+1$ if $0 \leq t < T$ and $e(t)=-1$ if $T \leq t < 2T$, when the pulse width is higher than the threshold.

* * * * *